(12) United States Patent
Takayama

(10) Patent No.: US 8,559,875 B2
(45) Date of Patent: Oct. 15, 2013

(54) COMMUNICATION DEVICE, DATA PROCESSING DEVICE, NEAR FIELD COMMUNICATION DEVICE, AND METHOD AND PROGRAM FOR COMMUNICATION

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 729 days.

(21) Appl. No.: 11/698,173

(22) Filed: Jan. 26, 2007

(65) Prior Publication Data

US 2007/0190937 A1 Aug. 16, 2007

(30) Foreign Application Priority Data

Jan. 30, 2006 (JP) ................................. 2006-020610

(51) Int. Cl.
*H04B 7/00* (2006.01)
(52) U.S. Cl.
USPC .......................... 455/41.2; 455/41.1; 455/607
(58) Field of Classification Search
USPC ........................................ 455/41.1, 41.2, 607
See application file for complete search history.

(56) References Cited

U.S. PATENT DOCUMENTS

| | | | | |
|---|---|---|---|---|
| 5,063,612 A * | 11/1991 | McKeown | ..................... | 398/136 |
| 5,079,766 A * | 1/1992 | Richard et al. | ................. | 370/445 |
| 2003/0036408 A1* | 2/2003 | Johansson et al. | ............ | 455/560 |
| 2003/0114898 A1 | 6/2003 | Von Arx et al. | | |
| 2004/0176032 A1 | 9/2004 | Kotola et al. | | |
| 2005/0077356 A1* | 4/2005 | Takayama et al. | ............. | 235/451 |
| 2005/0245202 A1* | 11/2005 | Ranta et al. | ..................... | 455/78 |
| 2006/0116744 A1 | 6/2006 | Von Arx et al. | | |

FOREIGN PATENT DOCUMENTS

| | | |
|---|---|---|
| JP | 62-251951 | 11/1987 |
| JP | 5-130114 | 5/1993 |
| JP | 05-276172 | 10/1993 |
| JP | 2000-124951 | 4/2000 |
| JP | 2004-200840 | 7/2004 |
| JP | 2004-215225 | 7/2004 |
| JP | 2005-168069 | 6/2005 |
| JP | 2006-159958 | 6/2005 |
| JP | 2005-210741 | 8/2005 |
| JP | 2005-218127 | 8/2005 |
| JP | 2005-294032 | 10/2005 |
| WO | WO 2005/091997 | 11/2005 |

OTHER PUBLICATIONS

Japanese Patent Office Action, dated Jan. 29, 2010, issued in counterpart JP Application No. 2006-020610 (3 pages).
Written Opinion & Search Report issued from Hungarian Intellectual Property Office, for counterpart Application No. 200905105-3 (12 pages).

* cited by examiner

*Primary Examiner* — Edward Urban
*Assistant Examiner* — Hsin-Chun Liao
(74) *Attorney, Agent, or Firm* — Sherr & Jiang, PLLC

(57) ABSTRACT

A communication device for performing near field communication, includes: a near field communication device having a near field communication section for performing near field communication in either one of an active mode and a passive mode, and an interface section for supplying the near field communication section with data from a data processing device for processing data targeted by communication of the near field communication section, and supplying the data processing device with data from the near field communication section; and one or more of the data processing devices connected to the interface section by one output bus on which the data output by the interface section is transmitted, and one input bus on which the data input to the interface section is transmitted, wherein the data processing device includes bus right management means.

7 Claims, 10 Drawing Sheets

COMMUNICATION DEVICE, DATA PROCESSING DEVICE, NEAR FIELD COMMUNICATION DEVICE, AND METHOD AND PROGRAM FOR COMMUNICATION

CROSS REFERENCES TO RELATED APPLICATIONS

The present invention contains subject matter related to Japanese Patent Application JP 2006-020610 filed in the Japan Patent Office on Jan. 30, 2006, the entire contents of which being incorporated herein by reference.

BACKGROUND OF THE INVENTION

1. Technical Field

The present invention relates to a communication device, a data processing device, a near field communication device, and a method and a program for communication, and particularly to a communication device, a data processing device, a near field communication device, and a method and a program for communication, which make it possible to realize a communication device formed of, for example, one near field communication device for performing near field communication and a plurality of data processing devices connected to the near field communication device and for performing processing of the data targeted by the near field communication.

2. Related Art

An integrated circuit (IC) card system capable of performing near field communication, one of wireless communication methods, has been becoming popularized rapidly because of its convenience. The IC card system is composed, for example, of an IC card and a reader/writer, wherein the reader generates an electromagnetic wave to form a so-called radio frequency (RF) field (a magnetic field). Then, when the IC card comes closer to the reader/writer, the IC card is supplied with power by the electromagnetic induction, and performs data transmission with the reader/writer. Such an IC card system is applied to, for example, an automatic ticket checking system in a station, a system for performing electronic payment by electronic money, and so on.

Further, in recent days, cellular phones have rapidly been popularized, and a device formed by integrating an IC card and a cellular phone, namely a cellular phone having (a function of) the IC card performing near field communication built-in, has been put into practical use. It should be noted that although the cellular phone has the same function as the IC card, a so-called IC chip with a chip-shape is built-in instead of an IC card with a card-shape.

Along with the popularization of the IC card (IC chip) performing near field communication, a communication protocol for performing the near field communication available to such an IC card has been standardized. As such a communication protocol, the near field communication interface and protocol (NFCIP)-1, for example, can be cited, which is defined as ISO/IEC18092.

In NFCIP-1, there are defined an active mode as a communication mode in which an electromagnetic wave is output and modulated to perform data transmission in each of a plurality of devices for performing transmission/reception of data, and a passive mode as a communication mode in which an electromagnetic wave is output and modulated to perform data transmission in one of the plurality of devices and the electromagnetic wave output by the one device is load-modulated to perform data transmission in other devices of the plurality of devices, and the communication is performed in either one of the active mode and the passive mode between the plurality of devices compliant to NFCIP-1 (see, for example, JP-A-2004-215225, or "Information technology Telecommunications and information exchange between systems Near Field Communication Interface and Protocol (NFCIP-1)," First edition, 2004-04-01, ISO/IEC 18092:2004 (E)).

In the meantime, the function of the IC card can be divided into an RF function for performing near field communication and a data processing function for performing processing (e.g., a processing for storing the data in a secure manner) of the data targeted by the near field communication by the RF function. Assuming now that the part for controlling the RF function is called a near field communication device and the part for controlling the data processing function is called a data processing device, the near field communication device and the data processing device are generally composed of a single-chip IC (large scale integration (LSI)) for the sake of miniaturization.

If NFCIP-1 described above is adopted as the communication protocol for performing the near field communication, NFCIP-1 is implemented in the near field communication device.

SUMMARY OF THE INVENTION

There is a request for adopting data processing devices of various methods as the data processing device for processing the data targeted by the near field communication of the near field communication device implementing NFCIP-1. In other words, there is a request for adopting NFCIP-1 to the near field communication for exchanging data between the data processing devices of various methods.

It should be noted here that as the data processing devices of various methods, there are cited, for example, an IC chip called a secure application module (SAM) chip implementing a secure access memory for storing data in a secure manner adopted in an IC card called FeliCa (Registered Trademark, hereinafter abbreviated as (R)) system produced by Sony Corporation, a SAM chip implementing a secure access memory adopted in an IC card called MIFARE® system produced by Royal Philips Electronics, an IC chip called a subscriber identify module (SIM) chip, which is adopted in cellular phones and subscriber information (e.g., a telephone number) necessary for the user to use the cellular phone is written to.

In response to the request for adopting NFCIP-1 to the near field communication as described above, an NFC-Wired Interface (NFC-WI) standard is under establishment in European Computer Manufacturers Association (ECMA) as a standard of an interface for exchanging data in a wired manner between the near field communication device implementing NFCIP-1 and the data processing device for processing the data targeted by the near field communication by the near field communication device.

In the NFC-WI standard under establishment in ECMA, as the buses for exchanging data between the near field communication device and the data processing device, there are prepared two buses, namely one output bus through which the data output from the near field communication device to the data processing device is transmitted, and another one input bus through which the data input from the data processing device to the near field communication device is transmitted. In this case, the near field communication device transmits the data to the data processing device via the output bus while the data processing device transmits the data to the near field communication device via the input bus.

As described above, although according to the NFC-WI standard under establishment in ECMA, the near field communication device transmits the data to the data processing device via the output bus, which is one of the two buses, the input bus and the output bus, and the data processing device transmits the data to the near field communication device via the one input bus, no mechanism for sharing the one input bus among a plurality of data processing devices is proposed.

Therefore, it has been difficult that a plurality of data processing devices is connected to each of the input bus and the output bus in the active states and one of the plurality of data processing devices selectively performs communication with the near field communication device.

In view of the above condition, it is desirable to realize a communication device composed of one near field communication device for performing near field communication and a plurality of data processing devices connected to the near field communication device and for processing the data targeted by the communication by the near field communication device.

According to an embodiment of the invention, there is provided a communication device for performing near field communication, including a near field communication device having a near field communication section for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section for supplying the near field communication section with data from a data processing device for processing data targeted by communication of the near field communication section, and supplying the data processing device with data from the near field communication section, and one or more of the data processing devices connected to the interface section by one output bus on which the data output by the interface section is transmitted, and one input bus on which the data input to the interface section is transmitted, wherein the data processing device includes bus right management means for judging whether or not a state, in which a voltage level of the input bus is an unused level representing that the input bus is not used, has continued for a predetermined time period determined using a random number, and for setting the voltage level of the input bus to an in-use level representing that the input bus is in use, thereby obtaining a right of use of the input bus if it is judged that the state, in which the voltage level of the input bus is the unused level, has continued for the predetermined time period.

In the communication device of this embodiment described above, whether or not the state in which the voltage level of the input bus is the unused level representing that the input bus is not used has continued for a predetermined time period determined using a random number in one or more of the data processing devices connected to the interface section by the one output bus on which the data output by the interface is transmitted and the one input bus on which the data input to the interface section is transmitted, and if it is judged that the state in which the voltage level of the input bus is unused level has continued for a predetermined time period, the voltage level of the input bus is set to the in-use level representing that the input bus is in use, thus the right of use of the input bus is obtained.

According to another embodiment of the invention, there is provided a data processing device to be connected to a near field communication device having a near field communication section for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section for supplying the near field communication section with data from a data processing device for processing data targeted by communication of the near field communication section, and supplying the data processing device with data from the near field communication section, the data processing device including bus right management means, connected to the interface section by one output bus on which the data output by the interface section is transmitted, and one input bus on which the data input to the interface section is transmitted, for judging whether or not a state, in which a voltage level of the input bus is an unused level representing that the input bus is not used, has continued for a predetermined time period determined using a random number, and for setting the voltage level of the input bus to an in-use level representing that the input bus is in use, thereby obtaining a right of use of the input bus if it is judged that the state, in which the voltage level of the input bus is the unused level, has continued for the predetermined time period.

Further, according to another embodiment of the invention, there is provided a method for communication of a data processing device, or a program to be executed by a computer for controlling a data processing device, connected to a near field communication device having a near field communication section for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section for supplying the near field communication section with data from a data processing device for processing data targeted by communication of the near field communication section, and supplying the data processing device with data from the near field communication section, the data processing device being connected to the interface section by one output bus on which the data output by the interface section is transmitted, and one input bus on which the data input to the interface section is transmitted, the method or the program including the steps of judging whether or not a state, in which a voltage level of the input bus is an unused level representing that the input bus is not used, has continued for a predetermined time period determined using a random number, and setting the voltage level of the input bus to an in-use level representing that the input bus is in use, thereby obtaining a right of use of the input bus if it is judged that the state, in which the voltage level of the input bus is the unused level, has continued for the predetermined time period.

In the data processing device, method for communication, or a program of this embodiment described above, whether or not the state in which the voltage level of the input bus is the unused level representing that the input bus is not used has continued for a predetermined time period determined using a random number in one or more of the data processing devices connected to the interface section by the one output bus on which the data output by the interface is transmitted and the one input bus on which the data input to the interface section is transmitted, and if it is judged that the state in which the voltage level of the input bus is unused level has continued for a predetermined time period, the voltage level of the input bus is set to the in-use level representing that the input bus is in use, thus the right of use of the input bus is obtained.

According to another embodiment of the invention, there is provided a communication device for performing near field communication, including a near field communication section for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section for supplying the near field communication section with data from a data processing device for processing data targeted by communication of the near field communication section, and supplying the data processing device with data from the near field communication section, and one or more of the data processing devices connected to the interface section by one output bus on which the data output by the interface section is transmitted, and one input bus on which the data input to the interface section is transmitted, wherein the interface section transmits a request for communication with one data processing device out of the one or more of the data processing devices via the output bus, and receives a response the one data processing device transmits in response to the request for communication via the input bus.

In the communication device according to this embodiment, the interface section and the one or more of the data processing devices are connected to each other by the one output bus on which the data output by the interface section is transmitted and the one input bus on which the data input to the interface section is transmitted, and in the interface section, the request for communication with the one data processing device out of the one or more of the data processing devices is transmitted via the output bus, and the response the one data processing device transmits in response to the request of communication via the input bus is received.

According to another embodiment of the invention, there is provided a near field communication device including a near field communication section for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section for supplying the near field communication section with data from a data processing device for processing data targeted by communication of the near field communication section, and supplying the data processing device with data from the near field communication section, wherein the interface section is connected to one or more of the data processing devices by one output bus on which the data output by the interface section is transmitted, and one input bus on which the data input to the interface section is transmitted, and the interface section transmits a request for communication with one data processing device out of the one or more of the data processing devices via the output bus, and receives a response the one data processing device transmits in response to the request for communication via the input bus.

According to another embodiment of the invention, there is provided a method for communication of a near field communication device, or a program to be executed by a computer for controlling a near field communication device having a near field communication section for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section for supplying the near field communication section with data from a data processing device for processing data targeted by communication of the near field communication section, and supplying the data processing device with data from the near field communication section, wherein the interface section is connected to one or more of the data processing devices by one output bus on which the data output by the interface section is transmitted, and one input bus on which the data input to the interface section is transmitted, and the method or the program including the steps of transmitting by the interface section a request for communication with one data processing device out of the one or more of the data processing devices via the output bus, and receiving by the interface section a response the one data processing device transmits in response to the request for communication via the input bus.

In the near field communication device, the method for communication, or the program according to this embodiment, the interface section and the one or more of the data processing devices are connected to each other by the one output bus on which the data output by the interface section is transmitted and the one input bus on which the data input to the interface section is transmitted, and in the interface section, the request for communication with the one data processing device out of the one or more of the data processing devices is transmitted via the output bus, and the response the one data processing device transmits in response to the request of communication via the input bus is received.

It should be noted that the program can be recorded on a recording medium.

According to these embodiments of the invention, it becomes possible to realize the communication device composed of the one near field communication device for performing the near field communication and a plurality of data processing devices connected to the near field communication device and for processing the data targeted by the communication by the near field communication device.

DESCRIPTION OF THE PREFERRED EMBODIMENTS

An embodiment of the invention will now be explained, in which the correspondence between composing elements of the invention and the embodiment described in the specification or the accompanying drawings will be exemplified as follows. The description is for confirming that the embodiment for supporting the invention is described in the specification or the drawings. Therefore, even if any embodiments described in the specification or the drawings are not described here as the embodiment corresponding to the composing elements of the invention, it dose not mean that such embodiments do not correspond to the composing elements. On the contrary, even if the embodiment is described here as one corresponding to the composing element of the invention, this does not mean that the embodiment does not correspond to other composing elements than the above composing element.

Figure 1:
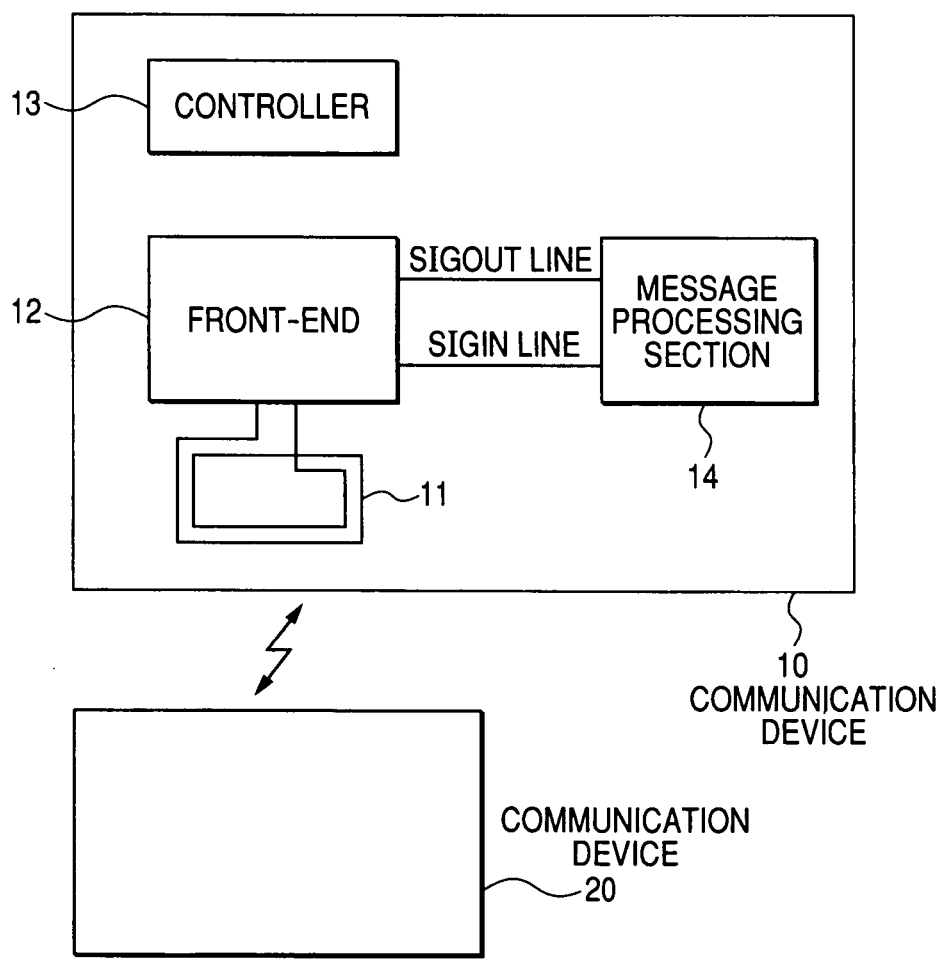
FIG. 1 is a block diagram showing a configuration example of an embodiment of a communication system to which the invention is applied.
Figure 2:
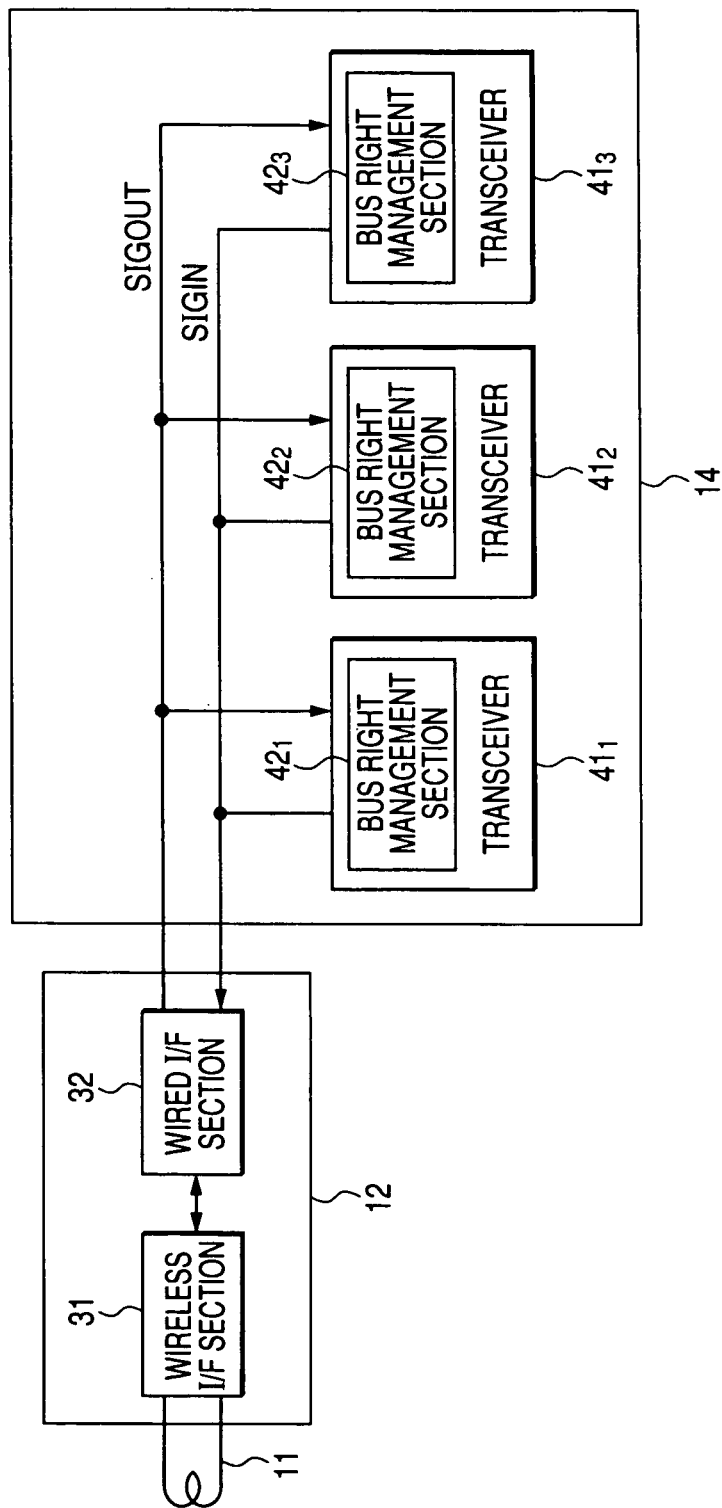
FIG. 2 is a block diagram showing a first configuration example of a front-end 12 and a message processing section 14.

A communication device of a first embodiment of the invention is a communication device (e.g., a communication device 10 shown in FIG. 1) for performing near field communication, including a near field communication device having a near field communication section (e.g., a wireless I/F section 31 in FIG. 2) for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section (e.g., a wired I/F section 32 shown in FIG. 2) for supplying the near field communication section with data from a data processing device for processing data communicated by the near field communication section and supplying the data processing device with data from the near field communication section, and one or more of the data processing devices (e.g., transceivers $41_1$, $41_2$, and $41_3$ shown in FIG. 2) connected to the interface section with one output bus (e.g., a SIGOUT line shown in FIG. 1) through which data output by the interface section is transmitted and with one input bus (e.g., a SIGIN line shown in FIG. 1) through which data input to the interface section is transmitted, wherein the data processing device has bus right management means (e.g., bus right management sections $42_1$, $42_2$, and $42_3$ shown in FIG. 2) for judging whether or not a state, in which a voltage level of the input bus is in an unused level representing that the input bus is not used, has continued for a predetermined time period determined using a random number, and obtaining a right of using the input bus by setting a voltage level of the input bus to an in-use level representing that the input bus is in use in response to a judgment that the state in which the voltage level of the input bus is in the unused level has continued for the predetermined time period.

According to a second embodiment of the invention, there is provided a data processing device (e.g., the transceivers $41_1$ through $41_3$ in FIG. 2) to be connected to a near field communication device (e.g., the front-end 12 in FIG. 1) having a near field communication section (e.g., the wireless I/F section 31 in FIG. 2) for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section (e.g., the wired I/F section 32 shown in FIG. 2) for supplying the near field communication section with data from a data processing device for processing data communicated by the near field communication section and supplying the data processing device with data from the near field communication section, and bus right management means (e.g., the bus right management sections $42_1$, $42_2$, and $42_3$ in FIG. 2), connected to the interface section by one output bus (e.g., the SIGOUT line in FIG. 1) on which the data output by the interface section is transmitted, and one input bus (e.g., the SIGIN line in FIG. 1) on which the data input to the interface section is transmitted, for judging whether or not a state, in which a voltage level of the input bus is an unused level representing that the input bus is not used, has continued for a predetermined time period determined using a random number, and for setting the voltage level of the input bus to an in-use level representing that the input bus is in use, thereby obtaining a right of use of the input bus if it is judged that the state, in which the voltage level of the input bus is the unused level, has continued for the predetermined time period.

According to the second embodiment of the invention, there is provided a method for communication of a data processing device, or a program to be executed by a computer for controlling a data processing device (e.g., the transceivers $41_1$ through $41_3$ in FIG. 2), connected to a near field communication device (e.g., the front-end 12 in FIG. 1) having a near field communication device having a near field communication section (e.g., the wireless I/F section 31 in FIG. 2) for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section (e.g., the wired I/F section 32 shown in FIG. 2) for supplying the near field communication section with data from a data processing device for processing data communicated by the near field communication section and supplying the data processing device with data from the near field communication section, and wherein the data processing device is connected to the interface section by one output bus (e.g., the SIGOUT line in FIG. 1) on which the data output by the interface section is transmitted, and one input bus (e.g., the SIGIN line in FIG. 1) on which the data input to the interface section is transmitted, the method or the program including the steps of judging (e.g., the step S14 in FIG. 3) whether or not a state, in which a voltage level of the input bus is an unused level representing that the input bus is not used, has continued for a predetermined time period determined using a random number, and setting the voltage level of the input bus to an in-use level representing that the input bus is in use, thereby obtaining (e.g., the step S16 in FIG. 3) a right of use of the input bus if it is judged that the state, in which the voltage level of the input bus is the unused level, has continued for the predetermined time period.

According to a third embodiment of the invention, there is provided a communication device (e.g., the communication device 10 in FIG. 1) for performing near field communication including a near field communication device (the front-end 12 in FIG. 1) having a near field communication section (e.g., the wireless I/F section 31 in FIG. 6) for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section (e.g., the wired I/F section 51 shown in FIG. 6) for supplying the near field communication section with data from a data processing device for processing data communicated by the near field communication section and supplying the data processing device with data from the near field communication section, and one or more of the data processing devices (e.g., the transceivers $61_1$, $61_2$, and $61_3$ shown in FIG. 6) connected to the interface section with one output bus (e.g., the SIGOUT line shown in FIG. 1) through which data output by the interface section is transmitted and with one input bus (e.g., the SIGIN line shown in FIG. 1) through which data input to the interface section is transmitted, wherein the interface section transmits a request for communication with one data processing device out of the one or more of the data processing devices via the output bus, and receives a response the one data processing device transmits in response to the request for communication via the input bus.

According to a fourth embodiment of the invention, there is provided a near field communication device (the front-end 12 in FIG. 1) including a near field communication section (e.g., the wireless I/F section 31 in FIG. 6) for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section (e.g., the wired I/F section 51 in FIG. 6) for supplying the near field communication section with the data from the data processing device (e.g., transceivers $61_1$, $61_2$, and $61_3$ in FIG. 6) for processing the data targeted by the communication of the near field communication section, and supplying the data processing section with the data from the near field communication section, wherein the interface section is connected to one or more of the data processing devices by one output bus (e.g., the SIGOUT line in FIG. 1) on which the data output by the interface section is transmitted, and one input bus (e.g., the SIGIN line in FIG. 1) on which the data input to the interface section is transmitted, and the interface section transmits a request for communication with one data processing device out of the one or more of the data processing devices via the output bus, and receives a response the one data processing device transmits in response to the request for communication via the input bus.

According to the fourth embodiment of the invention, there is provided a method for communication of a near field communication device (e.g., the front-end 12 in FIG. 1), or a program to be executed by a computer for controlling a near field communication device having a near field communication section (e.g., the wireless I/F section 31 in FIG. 6) for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section (e.g., the wired I/F section 51 in FIG. 6) for supplying the near field communication section with the data from the data processing device (e.g., transceivers $61_1$, $61_2$, and $61_3$ in FIG. 6) for processing the data targeted by the communication of the near field communication section, and supplying the data processing section with the data from the near field communication section, wherein the interface section is connected to one or more of the data processing devices by one output bus (e.g., the SIGOUT line in FIG. 1) on which the data output by the interface section is transmitted, and one input bus (e.g., the SIGIN line in FIG. 1) on which the data input to the interface section is transmitted, and the method or program including the steps of the interface section transmitting (e.g., the step S21 in FIG. 7) a request for communication with one data processing device out of the one or more of the data processing devices via the output bus, and the interface section receiving (e.g., the step S24 in FIG. 7) a response the one data processing device transmits in response to the request for communication via the input bus.

Hereinafter, embodiments of the present invention will be described with reference to the accompanying drawings.

FIG. 1 shows a configuration example of an embodiment of a communication system (a term "system" denotes an object composed of a plurality of devices assembled logically, and whether or not the devices of respective components are included in the same housing is no object) to which the invention is applied.

In FIG. 1, the communication system is composed of a communication devices 10 and 20, wherein it is arranged that a near field communication, which is a type of wireless communication, can be performed between the communication device 10 and the communication device 20.

In other words, the communication device 10 and the communication device 20 are both configured as devices (hereinafter arbitrarily referred to as NFC devices) for performing near field communication compliant with, for example, NFCIP-1 as wireless communication.

In this case, the NFC device can perform near field communication by electromagnetic induction using a carrier wave of single frequency such as 13.56 MHz in the industrial scientific medical (ISM) band with another NFC device.

It should be noted that the near field communication denotes the communication, which is made possible when the distance between the devices to communicate with each other becomes shorter than several tens of centimeters, and includes the communication performed by bringing (the housings of) the devices to make communication into contact with each other.

The NFC device can perform communication in two modes. As the two modes, as described above, the passive mode and the active mode can be cited. Focusing now on the communication between the two NFC devices, in the passive mode, one of the two NFC devices transmits data to the other NFC device by modulating (a carrier wave corresponding to) an electromagnetic wave generated by itself, and the other NFC device transmits data to the one NFC device by load-modulating (a carrier wave corresponding to) an electromagnetic wave generated by the one NFC device.

Further, in the active mode, both of the two NFC devices transmit data by modulating (the carrier waves corresponding to) the electromagnetic waves generated by themselves.

It should be noted here that the NFC device, which takes control of communication by outputting an electromagnetic wave first to commence the communication in performing the near field communication, is called an initiator. The near field communication is performed in such a manner that the initiator transmits a command to the communication partner and then the communication partner returns the response, wherein the communication partner, which returns the response to the command from the initiator, is called a target.

If it is assumed that one of the two NFC devices commences outputting an electromagnetic wave to start communication with the other NFC device, the one NFC device commencing outputting the electromagnetic wave first becomes the initiator, and the other NFC device becomes the target.

Further, in the passive mode, the initiator continues outputting the electromagnetic wave, and transmits data to the target by modulating the electromagnetic wave output by itself. On the other hand, the target transmits data to the initiator by load-modulating the electromagnetic wave, which the initiator is outputting.

On the other hand, in the active mode, the initiator commences outputting the electromagnetic wave and then modulates the electromagnetic wave, thereby transmitting data to the target. Then, the initiator stops outputting the electromagnetic wave after termination of the data transmission. When the initiator stops outputting the electromagnetic wave, the target commences outputting an electromagnetic wave and modulates the electromagnetic wave, thereby transmitting data to the initiator. Then, the target stops outputting the electromagnetic wave after termination of the data transmission.

It should be noted that a plurality of NFC devices can simultaneously output electromagnetic waves, and in this case, collision of electromagnetic waves output by the respective NFC devices occurs, which makes it difficult to perform communication, if the plural NFC devices commencing output of the electromagnetic waves are adjacent to each other.

Therefore, the NFC device is arranged to detect whether or not (a radio frequency (RF) field caused by) an electromagnetic wave from another device (e.g., an NFC device) exists, and to commence outputting an electromagnetic wave only when it does not exist, thereby avoiding the collision. It should be noted here that such a process of detecting whether or not the electromagnetic wave from another device exists and commencing the output of the electromagnetic wave only when it does not exist is called an RF collision avoidance (RFCA) process because of the object of avoiding the collision.

In the RFCA process, output of electromagnetic wave is commenced when no electromagnetic wave caused by any other devices is detected for a predetermined period of time. It should be noted here that the predetermined period of time is arranged to be determined using a random number, thus the reduction of possibility that plural NFC devices commence outputting electromagnetic waves with the same timing is intended.

Further, NFC devices can perform data transmission at various transmission rates such as 106 kilobits per second (kbps), 212 kbps, or 424 kbps. Still further, NFC devices can alter the transmission rate in the middle of communication commenced with a certain transmission rate.

The communication device 10, the NFC device as described above, is composed of an antenna 11, a front-end 12, a controller 13, and a message processing section 14.

An antenna 11 forms a closed loop coil, and an electromagnetic wave is output in response to variation in the current flowing through the coil. Further, a current flows through the antenna 11 in response to variation in the electromagnetic wave (the magnetic flux) passing through the coil as the antenna 11. The signal (the current) flowing through the antenna 11 is supplied to the front-end 12.

The front-end 12 is, for example, an IC of a single chip for performing communication compliant with NFCIP-1 (in which NFCIP-1 is executed), and performs near field communication (wireless communication) with the communication device 20 or other NFC devices via the antenna 11.

In other words, the front-end 12 is a near field communication device, which is a part for controlling an RF function performing the near field communication compliant with NFCIP-1, and performs the near field communication with an NFC device via the antenna 11 in either one of communication modes, the active mode and the passive mode.

Further, the front-end 12 is electrically connected to the message processing section 14 as one or more of data processing devices for performing processing of data targeted by the near field communication by the SIGOUT line and the SIGIN line.

It should be noted here that the SIGOUT line is a single bus line (an output bus) through which the data output by the front-end 12 (a wired I/F section 32 shown in FIG. 2, a wired I/F section 51 shown in FIG. 6, described later, or the like thereof) is transmitted. The data output by the front-end 12 and input to the message processing section 14 is transmitted from the front-end 12 to the message processing section 14 via the SIGOUT line.

Further, the SIGIN line is a single bus line (an input bus) physically separated from the SIGOUT line, through which the data input to the front-end 12 (a wired I/F section 32 shown in FIG. 2, a wired I/F section 51 shown in FIG. 6, described later, or the like thereof) is transmitted. The data output by the message processing section 14 and input to the front-end 12 is transmitted from the message processing section 14 to the front-end 12 via the SIGIN line.

The front-end 12 transmits the data or the like (including a command) received by the near field communication to the message processing section 14 via the SIGOUT line while receiving the data or the like to be transmitted by the near field communication transmitted by the message processing section 14 via the SIGIN line, thus performing wired communication with the message processing section 14.

It should be noted that although each of the front-end 12 and the message processing section 14 is provided with terminals connected to the SIGOUT line and the SIGIN line for connecting the both sides to each other, the illustration of the terminals is omitted for preventing the drawing from becoming complicated.

The controller 13 controls the whole of the communication device 10. Further, the controller 13 also performs a process in accordance with an application to which the communication device 10 is applied. That is, for example, the communication device 10 can be applied to, for example, a cellular phone, and in this case, the controller 13 controls a block (not shown) in the communication device 10 functioning as the cellular phone. As the block functioning as the cellular phone, for example, a block having a function of making a call and a block for browsing the web or creating an e-mail can be cited.

The message processing section 14 includes transceivers $41_1$ through $41_3$ shown in FIG. 2 or transceivers $61_1$ through $61_3$ shown in FIG. 6 described later, which are data processing devices for performing processing of the data targeted by the near field communication by the front-end 12, and performs the wired communication (exchange of data in a wired manner) to receive the data transmitted thereto by the wired communication and to perform a process such as storing the data according to needs. Further, the message processing section 14 performs a process such as retrieving the data stored therein to transmit by the wired communication.

It should be noted here that the message processing section 14 is connected to the front-end 12 by the SIGOUT line and the SIGIN line. Further, the message processing section 14 transmits data to the front-end 12 via the SIGIN line, while receiving data transmitted from the front-end 12 via the SIGOUT line, thus performing wired communication with the front-end 12.

Further, the message processing section 14 can be configured as, for example, a subscriber identify module (SIM) card compliant with ISO 7816 or a user identify module (UIM, also called universal SIM (USIM)) card compliant with an upper standard of that of the SIM card. Further, the message processing section 14 as an SIM card (or a UIM card) can be provided with, for example, a tamper-resistant SAM chip (an IC chip of SAM) for performing, for example, management of a key (an encryption key) used for identification or encryption of the data, an electronic money, and others housed therein besides an SIM chip (an IC chip of SIM).

It should be noted that the message processing section 14 can previously be housed in the communication device 10 or formed as an object (hardware) detachably attached by the user to the communication device 10 with ease. If the message processing section 14 is detachably attached to the communication device 10, the terminals of the message processing section 14 not shown are electrically connected to the SIGOUT line and the SIGIN line, respectively, by attaching the message processing section 14 to the communication device 10.

Further, the communication device 10 is provided with, for example, a battery not shown housed therein, thus the front-end 12, the controller 13, and the message processing section 14 are supplied with power from the battery. It should be noted that in the communication device 10 the front-end 12 can obtain power from the electromagnetic wave output by the communication device 20 or the like in performing the near field communication to supply the front-end 12 itself, further the controller 13, and the message processing section 14 with the power.

As described above, the communication device 20 is an NFC device. It should be noted that the communication device 20 can have the same configuration as that of the communication device 10 or a different configuration therefrom.

The communication device 20 can be applied for, for example, a reader/writer of an automatic ticket checker. In this case, the communication device 20 reads out commuter ticket information (e.g., an expiration date or an available block of stations) from an IC card as the commuter ticket coming closer to the communication device 20 by the near field communication, judges whether or not the information of the commuter ticket is appropriate, and controls the automatic ticket checker in accordance with the result of the judgment.

Further, the communication device 20 can also be applied to, for example, an IC card capable of performing electronic payment besides the above. In this case, the communication device 20 stores electronic money, and performs update or the like of the electronic money stored therein in accordance with a request from an NFC device not shown for performing the process of the electronic payment.

Since the communication device 10 and the communication device 20 configured as above are both NFC devices, they can perform the near field communication compliant with NFCIP-1.

In other words, the front-end 12 of the communication device 10 is able to perform the near field communication compliant with NFCIP-1 with the communication device 20.

Further, the front-end 12 of the communication device 10 is able to perform wired communication with the message processing section 14 connected thereto with the SIGOUT line and the SIGIN line.

Therefore, according to the communication system shown in FIG. 1, the front-end 12 of the communication device 10 can receive data from the communication device 20 by the near field communication, and further transmit the data to the message processing section 14 by the wired communication via the SIGOUT line. Further, the front-end 12 can receive data (e.g., data output by the message processing section 14 as the response to the data transmitted from the communication device 20 via the front-end 12) from the message processing section 14 by the wired communication via the SIGIN line, and transmit the data to the communication device 20 by the near field communication.

As a result, the message processing section 14 and the communication device 20 can exchange data via the front-end 12.

Therefore, in the case in which, for example, the message processing section 14 stores information of a commuter ticket, and the communication device 20 is applied to an automatic ticket checker, the communication device 20 can read out the information of the commuter ticket stored in the message processing section 14 to control the automatic ticket checker in accordance with the information of the commuter ticket.

Further, in the case in which, for example, the message processing section 14 also stores electronic money, and the communication device 20 is a device for performing electronic payment, then the communication device 20 can read out the electronic money stored in the message processing section 14 via the front-end 12 to perform the process of the electronic payment corresponding to the purchase of goods performed by the user of the communication device 10.

Meanwhile, FIG. 2 shows a first configuration example of the front-end 12 and the message processing section 14 shown in FIG. 1.

In FIG. 2, the front-end 12 is composed of a wireless interface (I/F) section 31 and a wired I/F section 32. Further, the message processing section 14 includes three, namely more than one, transceivers $41_1$, $41_2$, and $41_3$.

The wireless I/F section 31 is a near field communication section for performing the near field communication compliant with NFCIP-1, and performs the near field communication with an NFC device via the antenna 11 in either one of communication modes, the active mode and the passive mode.

Specifically, in the case in which, for example, the communication is performed in the active mode, the wireless I/F section 31 performs the RFCA process to commence outputting an electromagnetic wave as a carrier, and modulates the carrier in accordance with the data supplied from the wired I/F section 32, thereby transmitting the data to an NFC device such as the communication device 20 (FIG. 1). Further, the wireless I/F section 31 receives a modulated wave, which is an electromagnetic wave as a carrier modulated with the data by the NFC device such as the communication device 20, and demodulates the modulated wave to supply the wired I/F section 32 with the data obtained by the demodulation.

Further, in the case in which, for example, the wireless I/F section 31 performs the communication as the initiator of the passive mode, it performs the RFCA process to commence outputting an electromagnetic wave as a carrier, and modulates the carrier in accordance with the data supplied from the wired I/F section 32, thereby transmitting the data to the NFC device such as the communication device 20. Further, the wireless I/F section 31 receives a modulated wave, which is an electromagnetic wave as a carrier output by itself and load-modulated by the NFC device such as the communication device 20, and demodulates the modulated wave to supply the wired I/F section 32 with the data obtained by the demodulation.

Further, in the case in which the wireless I/F section 31 performs communication as the target of the passive mode, for example, it load-modulates the electromagnetic wave output by the NFC device, such as the communication device 20, acting as the initiator of the passive mode with the data supplied from the wired I/F section 32, thereby transmitting the data to the NFC device. Still further, the wireless I/F section 31 receives a modulated wave, which is an electromagnetic wave output and then modulated with the data by the NFC device such as the communication device 20, and demodulates the modulated wave to supply the wired I/F section 32 with the data obtained by the demodulation.

It should noted that in the wireless I/F section 31, which one of the active mode and the passive mode is selected as the communication mode, or whether it acts as the initiator or as the target is controlled by, for example, the controller 13 (FIG. 1). The controller 13 controls the communication modes and so on in accordance with, for example, the operation by the user or the application the communication device 10 is applied to.

The wired I/F section 32 is connected to each of the transceivers $41_1$, $41_2$, and $41_3$ with the SIGOUT line and the SIGIN line, and receives the data transmitted from the transceivers $41_1$ through $41_3$ via the SIGIN line to supply the wireless I/F section 31 with the data while receiving the data supplied from the wireless I/F section 31 to supply the transceivers $41_1$ through $41_3$ with the data via the SIGOUT line.

The transceiver $41_i$ (where, i=1, 2, or 3) is a data processing device for controlling the data processing function for processing the data (the data targeted by the near field communication by the RF function) targeted by the communication of the wireless I/F section 31, and is composed of, for example, a single chip (an IC chip).

The transceiver $41_i$ is connected to the SIGOUT line and the SIGIN line in a so-called wired-OR manner, and receives the data output by the wired I/F section 32 and transmitted via the SIGOUT line. Further, the transceiver $41_i$ transmits data to the wired I/F section 32 via the SIGIN line.

Still further, the transceiver $41_i$ is provided with a bus right management section $42_i$ for performing arbitration in using the SIGIN line as a bus between the transceivers connected to the SIGOUT line and the SIGIN line.

The bus right management section $42_i$ judges whether or not the voltage level of the SIGIN line continues to be an unused level, which is one of a high (H) level and a low (L) level and represents that the SIGIN line is not in use, for a predetermined period of time determined using a random number, and only when it has judged that the voltage level of the SIGIN line has continued to be the unused level for the predetermined period of time, it sets the voltage level of the SIGIN line to an in-use level (the other of the H level and the L level than the unused level) representing that the SIGIN line is in use, thus obtaining the right of use of the SIGIN line (the right of use of the bus).

The transceiver $41_i$ performs exchange (transmission of data via the SIGIN line) of data with the wired I/F section 32 after the bus right management section $42_i$ has obtained the right of use of the SIGIN line.

Hereinafter, the process of the bus right management section $42_i$ of the transceiver $41_i$ will be explained with reference to the flowchart shown in FIG. 3.

When, for example, one transceiver $41_i$ required for exchanging data with the front-end 12 is designated in three transceivers $41_1$ through $41_3$ by the controller 13 (FIG. 1), the bus right management section $42_i$ of the transceiver $41_i$ judges whether or not the voltage level of the SIGIN line is the in-use level in the step S11.

If it is judged that the voltage level of the SIGIN line is the in-use level in the step S1, it returns to the step S11.

Further, if it is judged that the voltage level of the SIGIN line is not the in-use level in the step S11, it proceeds to the step S12, and the bus right management section $42_i$ judges whether or not the voltage level of the SIGIN line is the unused level.

If it is judged that the voltage level of the SIGIN line is not the unused level in the step S12, it returns to the step S11.

Further, if it is judged that the voltage level of the SIGIN line is the unused level in the step S12, it proceeds to the step S13 in which the bus right management section $42_i$ generates, for example, an integer random number n in a range of one through ten to determine the period of the random number n multiplied by predetermined unit time as the predetermined time period determined using the random number n, and then proceeds to the step S14.

In the step S14, the bus right management section $42_i$ judges whether or not the period of the random number n multiplied by predetermined unit time as the predetermined time period determined using the random number n has elapsed, while keeping the unused level, from when it has been judged that the voltage level of the SIGIN line is the unused level in the step S12.

If it is judged that the predetermined time period determined using the random number n has not elapsed in the step S14, it returns to the step S14.

Further, if it is judged that the predetermined time period determined using the random number n has elapsed while the voltage level of the SIGIN line keeps the unused level in the step S14, it proceeds to the step S15, and the bus right management section $42_i$ judges whether or not the voltage level of the SIGIN line is the in-use level.

If it is judged that the voltage level of the SIGIN line is the in-use level in the step S15, it returns to the step S11.

Further, if it is judged that the voltage level of the SIGIN line is not the in-use level in the step S15, namely if the voltage level of the SIGIN line dose not become the in-use level and keeps the unused level during the predetermined period determined using the random number n, in other words, no other transceivers out of the transceivers $41_1$ through $41_3$ connected to the SIGOUT line and the SIGIN line than the one transceiver $41_i$ intending to exchange data with the front-end 12 exchange data with the front-end 12, it proceeds to the step S16, and the bus right management section $42_i$ sets the voltage level of the SIGIN line to the in-use level, thus obtaining the right of use of the SIGIN line, and then the process is terminated.

After the bus right management section $42_i$ thus obtain the right of use of the SIGIN line as described above, the transceiver $41_i$ (cancels the control of the voltage level of the SIGIN line by the bus right management section $42_i$, and then) transmits data to the wired I/F section 32 via the SIGIN line and receives data transmitted from the wired I/F section 32 via the SIGOUT line.

Figure 3:
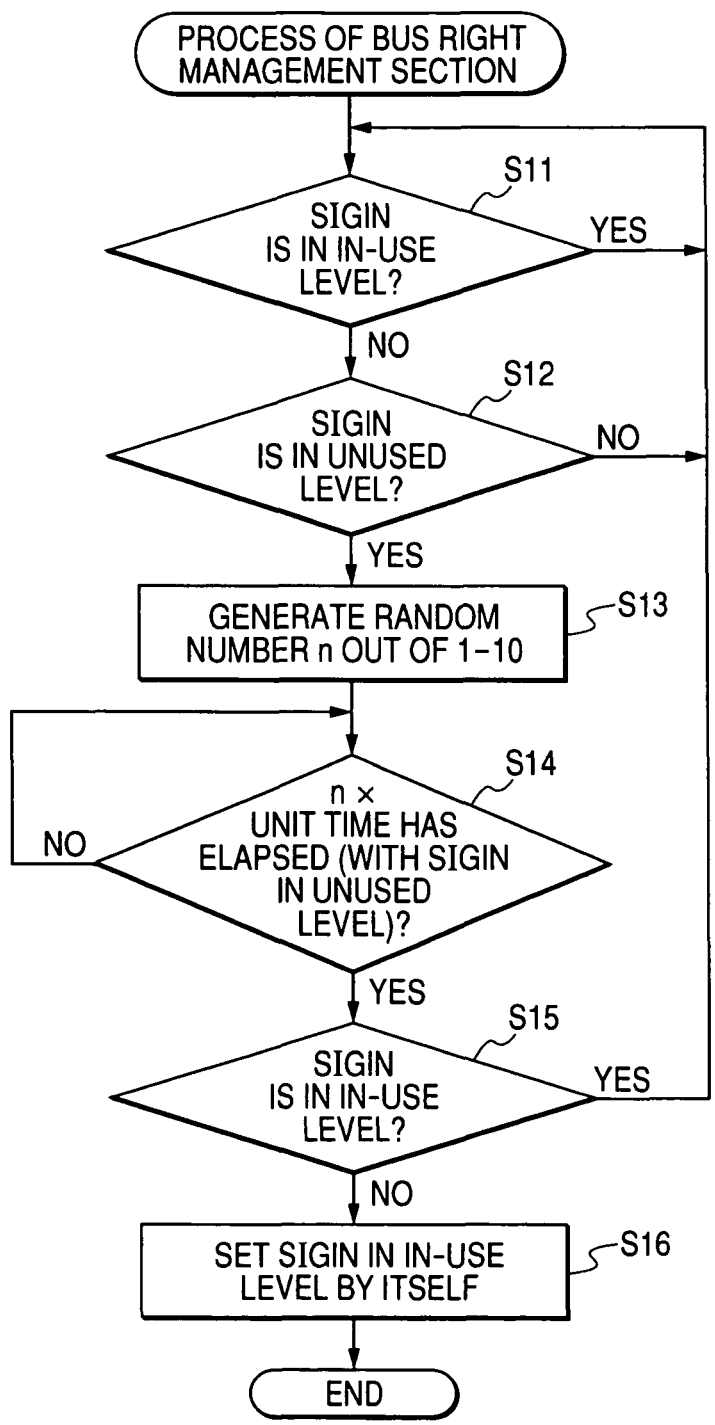
FIG. 3 is a flowchart for explaining a process of bus right management sections $42_1$ through $42_3$.

It should be noted that in the flowchart shown in FIG. 3, it is possible to return to the step S11 if the voltage level of the SIGIN line is the in-use level in the case in which it is judged that the predetermined time period determined using the random number n has not yet elapsed in the step S14.

Further, as the predetermined unit time used in the period of the random number n multiplied by the predetermined unit time as the predetermined time period determined using the random number n, there is adopted a time period with which a BUSY state, in which a transceiver (another transceiver) other than the one transceiver $41_i$ intending to exchange data with the front-end 12 obtains the right of use of the SIGIN line and exchanges data with the front-end, is never misjudged as other states (in which no data transmission is performed) than the BUSY state.

Specifically, it is assumed now that the in-use level is, for example, the H level, one of the H level and the L level, the unused level is the L level, the other thereof, and further, the data transmitted to the front-end 12 via the SIGIN line is, for example, Manchester coded data at 212 kbps.

In this case, the voltage level of the SIGIN line can be the L level, the unused level, for about 4.7 ms maximum. Therefore, if the unit time is set to be equal to or shorter than that value of about 4.7 ms, it might be misjudged that no other transceivers use the SIGIN line despite the fact that another transceiver uses the SIGIN line (despite the BUSY state), in other words, it might be judged that the period of the random number n multiplied by the predetermined unit time has elapsed while the voltage level of the SIGIN line keeps the L level, the unused level, in the step S14.

In order for preventing such a misjudgment, it is desirable to set the predetermined unit time to a value larger than the above described value of about 4.7 ms, such as of 5 ms.

As described above, since the one transceiver $41_i$ intending to exchange data with the front-end 12 perform the data exchange with the front-end 12 after obtaining the right of use of the SIGIN line, it becomes possible to connect the three transceivers $41_1$ through $41_3$, for example, as a plurality of transceivers to the single SIGOUT line and the single SIGIN line, respectively, and to allow the one transceiver $41_i$ of the three transceivers $41_1$ through $41_3$ selectively communicate with the front-end 12 (wired I/F section 32).

Therefore, it becomes possible to realize the communication device such as the communication device 10 shown in FIG. 1 having the one front-end 12 for performing the near field communication and a plurality of data processing devices such as the three transceivers $41_1$ through $41_3$ connected to the front-end 12 for processing the data targeted by the communication of the front-end 12.

Figure 4:
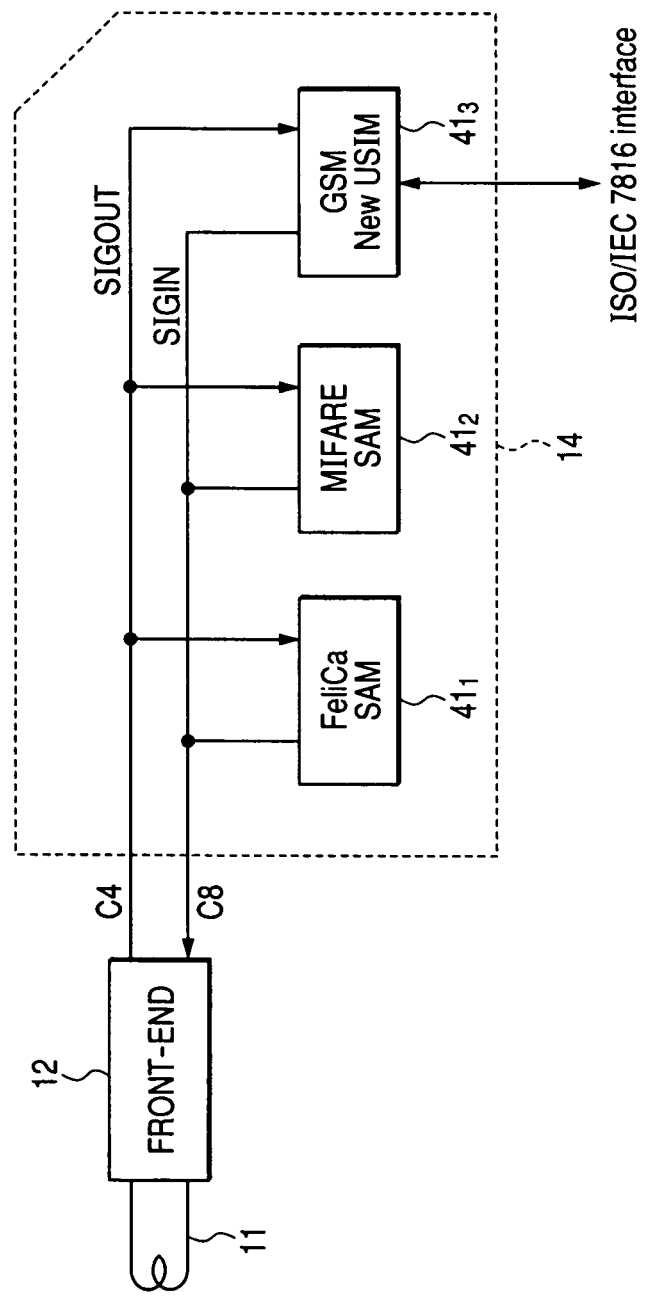
FIG. 4 is a block diagram showing a configuration example of the message processing section 14 adopting specific IC chips as transceivers $41_1$ through $41_3$.

Next, FIG. 4 shows the message processing section 14 adopting specific IC chips as the transceivers $41_1$ through $41_3$ shown in FIG. 2.

In FIG. 4, there is adopted a SIM card compliant with ISO 7816 as the message processing section 14.

Further, an SAM chip of the FeliCa (Registered Trademark) system is adopted as the transceiver $41_1$, and an SAM chip of the MIFARE (Registered Trademark) system is adopted as the transceiver $41_2$. Still further, a USIM chip of the global system for mobile (GSM) issued by a cellular phone company in accordance with a cellular phone contract is adopted as the transceiver $41_3$.

It should be noted here that as a service applying the SAM chip of the FeliCa (Registered Trademark) system, for example, there is a service handling electronic money such as EDY (Registered Trademark), and a service applying the SAM chip of the MIFARE (Registered Trademark) system is rendered, for example, in various countries in Europe and in the United States. Further, the USIM chip of GSM is used for management of telephone numbers of terminals such as a handset of the third generation cellular phone of the third generation mobile communication system and so on.

Therefore, according to the SIM card as the message processing section 14 shown in FIG. 4, it is possible to use the service of EDY (Registered Trademark) applying the SAM chip of the FeliCa (Registered Trademark) system in Japan, and at the same time, it is possible to use the services rendered applying the SAM chip of the MIFARE (Registered Trademark) system in various countries in Europe and in the United States. Further, it is possible to use the terminal of the third generation cellular phone all over the world as a terminal with a unique telephone number.

It should be noted that the USIM chip adopted as the transceiver $41_3$ in FIG. 4 is provided with an interface compliant with ISO 7816, and exchanges necessary data with the terminal of the third generation cellular phone via the interface.

Further, the SIM card adopted as the message processing section 14 in FIG. 4 is provided with terminals required in ISO 7816, wherein the terminal called C4 is connected to the SIGOUT line and the terminal called C8 is connected to the SIGIN line, respectively.

It should be noted here that although in FIG. 2 (the same applies to FIGS. 6 and 9 described later), the three transceivers $41_1$ through $41_3$ are mounted (built-in) in the message processing section 14 as the plurality of transceivers, the number of the transceivers mounted in the message processing section 14 can be two or no smaller than four.

Further, it is possible to mount only one transceiver in the message processing section 14. A configuration example of the communication device 10 mounting one transceiver in the message processing section 14 is shown in FIG. 5.

Figure 5:
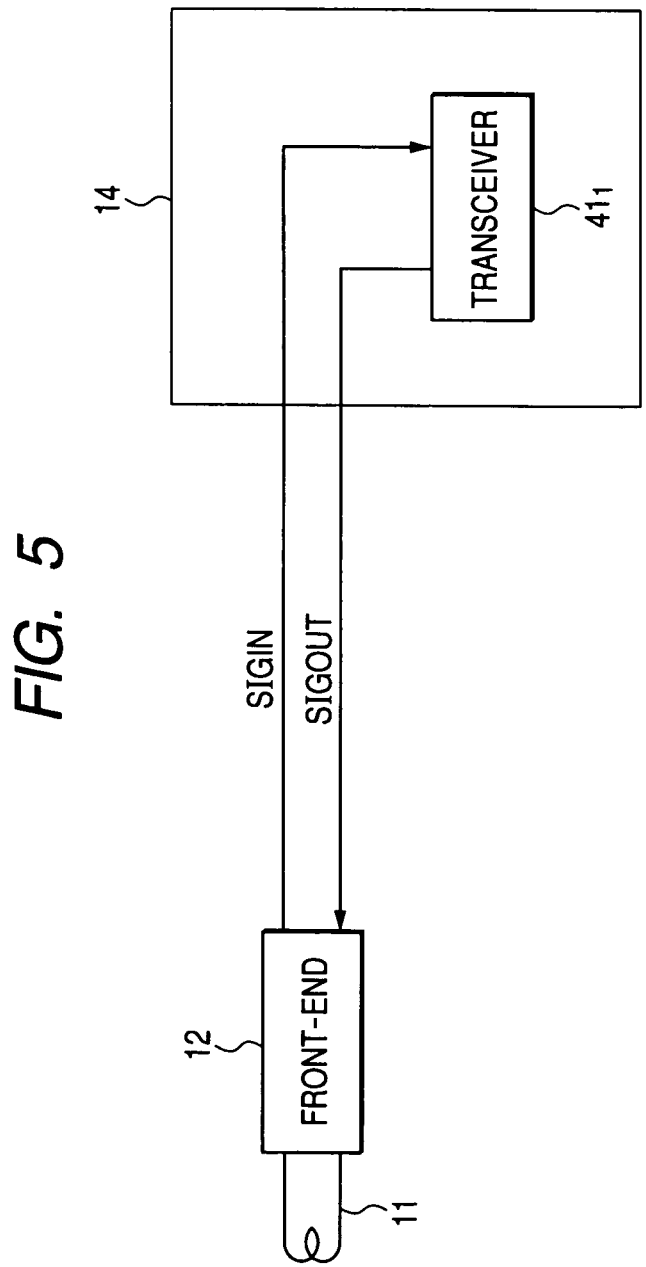
FIG. 5 is a block diagram showing a configuration example of a communication device 10 mounting one transceiver $41_1$ in the message processing section 14.

In FIG. 5, the one transceiver $41_1$ is mounted in the message processing section 14. It should be noted that the illustration of the controller 13 (FIG. 1) is omitted in FIG. 5.

Figure 6:
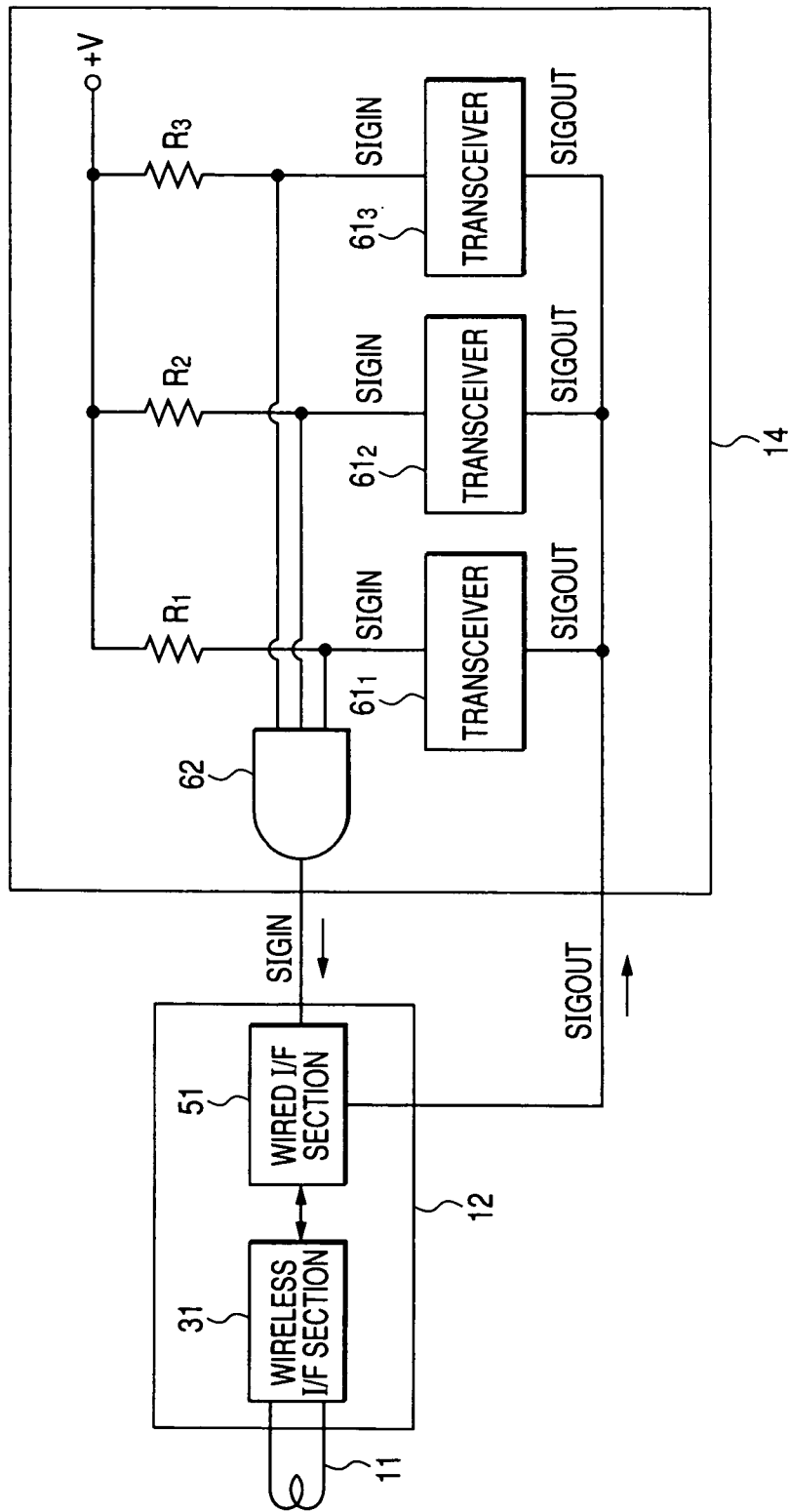
FIG. 6 is a block diagram showing a second configuration example of the front-end 12 and the message processing section 14.

Meanwhile, FIG. 6 shows a second configuration example of the front-end 12 and the message processing section 14 shown in FIG. 1. It should be noted that in the drawing the portions corresponding to the case in FIG. 2 are denoted with the same reference numerals, and hereinafter the explanations therefor will arbitrarily be omitted.

In FIG. 6, the front-end 12 is composed of the wireless I/F section 31 and the wired I/F section 51. Further, the message processing section 14 is composed of three, namely more than one, transceivers $61_1$, $61_2$, and $61_3$, an AND gate 62, and the same number of resistors $R_1$, $R_2$, and $R_3$ as the number of the transceivers $61_1$, $61_2$, and $61_3$.

The wired I/F section 51 is connected to each of the transceivers $61_1$ through $61_3$ with the SIGOUT line. Further, the wired I/F section 51 is connected to each of the transceivers $61_1$ through $61_3$ with the SIGIN line via the AND gate 62. Thus, the wired I/F section 51 supplies the wireless I/F section 31 with the data transmitted from the transceivers $61_1$ through $61_3$ via the AND gate 62 and the SIGIN line, and supplies the transceivers $61_1$ through $61_3$ via the SIGOUT line with the data supplied from the wireless I/F section 31.

Specifically, the wired I/F section 51 transmits request data requiring communication with the transceiver (hereinafter arbitrarily referred to as a noticed transceiver) intending to exchange data out of the three transceivers $61_1$ through $61_3$ via the SIGOUT line. Further, the wired I/F section 51 receives the response transmitted by the noticed transceiver in response to the request data via the SIGIN line and the AND gate 62.

It should be noted here that the request data transmitted by the wired I/F section 51 can include the original data (including a command) the wired I/F section 51 intends to transmit to the noticed transceiver, and the response transmitted by the noticed transceiver can include the original data the noticed transceiver intends to transmit to the wired I/F section 51. Therefore, the wired I/F section 51 and the noticed transceiver can exchange necessary data by the wired I/F section 51 transmitting the request data and the noticed transceiver transmitting the response to the request data.

The transceiver $61_i$ (where, i=1, 2, or 3) is a data processing device for controlling the data processing function for processing the data (the data targeted by the near field communication by the RF function) targeted by the communication of the wireless I/F section 31, and has basically the same configuration as the transceiver $41_i$ shown in FIG. 2.

It should be noted that the transceiver $61_i$ differs from the transceiver $41_i$ in lacking the bus right management section $42_i$. Further, when the transceiver $41_i$ shown in FIG. 2 intends to exchange data with (the wired I/F section 32 of) the front-end 12, it obtains the right of use of the SIGIN line to exchange the data with the front-end 12, whereas the transceiver $61_i$, in response to (the wired I/F section 51 of) the front-end 12 transmitting the request data addressed to the transceiver $61_i$ via the SIGOUT line, transmits the response to the request data via the SIGIN line and the AND gate 62, thereby performing the data exchange with the front-end 12, in which point the transceiver $61_i$ differs from the transceiver $41_i$ shown in FIG. 2.

The AND gate 62 is a three input one output AND gate whose output terminal is connected to the SIGIN line connected to the wired I/F section 51. Further, the ith input terminal of the three input terminals of the AND gate 62 is connected to a terminal of the transceiver $61_i$ to which the SIGIN line is to be connected.

The resistor $R_i$ is a pull-up resistor for pulling up the ith input terminal of the AND gate 62.

Specifically, the voltage +V as the H level is applied to one terminal of the resistor $R_i$, and the other terminal thereof is connected to the connection point between the transceiver $61_i$ and the ith input terminal of the AND gate 62.

The transceiver $61_i$ is arranged to set the terminal, to which the SIGIN line is connected, to either an open state or a grounded state in accordance with the data transmitted to the front-end 12. It should be noted that the transceiver $61_i$ is arranged to set the terminal to which the SIGIN line is connected to the open state when no data is exchanged with the front-end 12.

Therefore, in the condition in which the transceiver $61_i$ does not perform the data exchange with the front-end 12, the voltage level of the ith input terminal of the AND gate 62 is set to the H level corresponding to the voltage +V by the pull-up resistor $R_i$.

As a result, in the case in which no transceiver of the three transceivers $61_1$ through $61_3$ performs the data exchange with the front-end 12, the voltage levels of the three input terminals of the AND gate 62 are all set to the H level, thus the output terminal of the AND gate 62 becomes the H level.

On the other hand, in the case in which any one transceiver $61_i$ of the three transceivers $61_1$ through $61_3$ commences the data exchange with the front-end 12 as the noticed transceiver, the noticed transceiver $61_i$ sets the terminal to which the SIGIN line is connected to the open state or the grounded state in accordance with the data transmitted to the front-end 12 as described above.

When the noticed transceiver $61_i$ sets the terminal to which the SIGIN line is connected to the open state, no current flows through the resistor $R_i$, and as a result, the voltage level of the ith input terminal of the AND gate 62 becomes the H level, namely the voltage +V. Further, when the noticed transceiver $61_i$ sets the terminal to which the SIGIN line is connected to the grounded state, a current flows through the resistor $R_i$, and as a result, the voltage level of the ith input terminal of the AND gate 62 becomes the L level, which is the GND (ground) level.

As described above, the voltage level of the ith input terminal of the AND gate 62 varies between the H level and the L level in accordance with the data the noticed transceiver $61_i$ transmits to the front-end 12.

Further, since other transceivers of the three transceivers $61_1$ through $61_3$ than the noticed transceiver $61_i$ do not perform the data exchange with the front-end 12, the voltage levels of the two other input terminals of the AND gate 62 than the ith input terminal become the H level as described above.

Therefore, the voltage level of the output terminal of the AND gate 62 varies between the H level and the L level corresponding to the voltage level of the ith input terminal of the AND gate 62 varying between the H level and the L level, thus the data transmitted by the noticed transceiver 61 is transmitted to the front-end 12 via the SIGIN line connected to the output terminal of the AND gate 62.

Hereinafter, the process of the wired I/F section 51 shown in FIG. 6 will be explained with reference to the flowchart shown in FIG. 7.

Assuming that the any one transceiver $61_i$ of the three transceivers $61_1$ through $61_3$ mounted on the message processing section 14 is a noticed transceiver, in the case in which the wired I/F section 51 intends to perform data exchange with the noticed transceiver $61_i$, the wired I/F section 51 transmits (outputs on the SIGOUT line) the request data including identification for identifying the noticed transceiver $61_i$ via the SIGOUT line in the step S21 in order for calling out the noticed transceiver $61_i$.

It should be noted here that each of the three transceivers $61_1$ through $61_3$ mounted on the message processing section 14 is provided with identification (ID) capable of identifying it, and the wired I/F section 51 transmits the request data including the identification of the noticed transceiver $61_i$ via the SIGOUT line in the step S21.

Further, in the wired I/F section 51, which one of the three transceivers $61_1$ through $61_3$ mounted on the message processing section 14 is selected as the noticed transceiver is determined, for example, according to the control by the controller 13 (FIG. 1) performed in accordance with the user operations, or based on data transmitted from an external NFC device supplied from the wireless I/F section 31.

After the process of the step S21, it proceeds to the step S22, and the wired I/F section 51 judges whether or not the time-out has occurred, namely, the waiting period previously set as a time period for waiting for the response to the request data has elapsed after the request data has been transmitted in the step S21.

If it is judged that the time-out has occurred in the step S22, namely if no response to the request data returns before the waiting period has elapsed because, for example, the noticed transceiver $61_i$ is not mounted on the message processing section 14, the wired I/F section 51 terminates the process.

Further, if it is judged that the time-out has not occurred in the step S22, it proceeds to the step S23, and the wired I/F section 51 judges whether or not (the data as) the response has been transmitted via the SIGIN line.

If it is judged in the step S23 that the response has not been transmitted thereto, it returns to the step S22, and the same process is repeatedly performed thereafter.

Further, if it is judged in the step S23 that the response has been transmitted via the SIGIN line, namely if the noticed transceiver $61_i$ identified by the identification included in the request data the wired I/F section 51 has transmitted in the step S21 has transmitted the response via the AND gate 62 and the SIGIN line in response to the request data, it proceeds to the step S24, and the wired I/F section 51 receives the response transmitted thereto via the SIGIN line, further performs a necessary process such as transmitting the response to the wireless I/F section 31, and terminates the process.

As described above, since the wired I/F section 51 transmits the request data including the identification via the SIGOUT line, and receives the response the noticed transceiver $61_i$ identified by the identification included in the request data transmits via the SIGIN line in response to the request data, it becomes possible to connect, for example, the three transceivers $61_1$ through $61_3$ as a plurality of transceivers to the one SIGOUT line and the one SIGIN line, respectively, and to allow the one transceiver $61_i$ of the three transceivers $61_1$ through $61_3$ to selectively communicate with the front-end 12 (the wired I/F section 51).

Therefore, it becomes possible to realize the communication device such as the communication device 10 shown in FIG. 1 having the one front-end 12 for performing the near field communication and a plurality of data processing devices such as the three transceivers $61_1$ through $61_3$ connected to the front-end 12 for processing the data targeted by the communication of the front-end 12.

Hereinafter, the process of each of the transceivers $61_1$ through $61_3$ shown in FIG. 6 will be explained with reference to the flowchart shown in FIG. 8.

When the request data is transmitted thereto via the SIGOUT line, in the step S31, each of the transceivers $61_1$ through $61_3$ receives the request data and judges whether or not the request data is addressed to itself based on the identification included in the request data.

If it is judged in the step S31 that the request data is not addressed to itself, it returns to the step S31 when new request data is transmitted thereto, and the same process is repeatedly performed thereafter.

Further, if it is judged in the step S31 that the request data is addressed to itself, namely if the identification included in the request data is the identification of itself, it proceeds to the step S32, and the transceiver (the noticed transceiver) $61_i$ identified by the identification performs analysis of the request data, and performs the process corresponding to the result of the analysis, namely, for example, the process such as retrieving stored data and including it in the response to the request data.

Then it proceeds to the step S33 from the step S32, the noticed transceiver $61_i$ transmits the response to the request data via the AND gate 62 and the SIGIN line, and terminates the process.

According to the above processes, the response transmitted by the noticed transceiver $61_i$ is received by the wired I/F section 51 in the step S24.

It should be noted that although the three transceivers $61_1$ through $61_3$ are mounted in the message processing section 14 in FIG. 6, it is possible to mount different numbers of transceivers in the message processing section 14. However, in the case of mounting four or more transceivers, it is required to provide, for example, an AND gate provided with the same or greater number of input terminals as or than the number of the transceivers instead of the AND gate 62.

Further, in FIG. 6, if a certain transceiver $61_i$ out of the transceivers $61_1$ through $61_3$ is removed, the voltage level of the ith input terminal of the AND gate 62 becomes the H level due to the pull-up resistor $R_i$. Therefore, the voltage level of the ith input terminal of the AND gate 62 is not different from the condition in which the transceiver $61_i$ in the condition of not exchanging data with the front-end 12 is connected thereto, and accordingly, if the transceiver $61_i$ is removed, no effect is exerted on the data exchange between other transceivers and the front-end 12.

Figure 9:
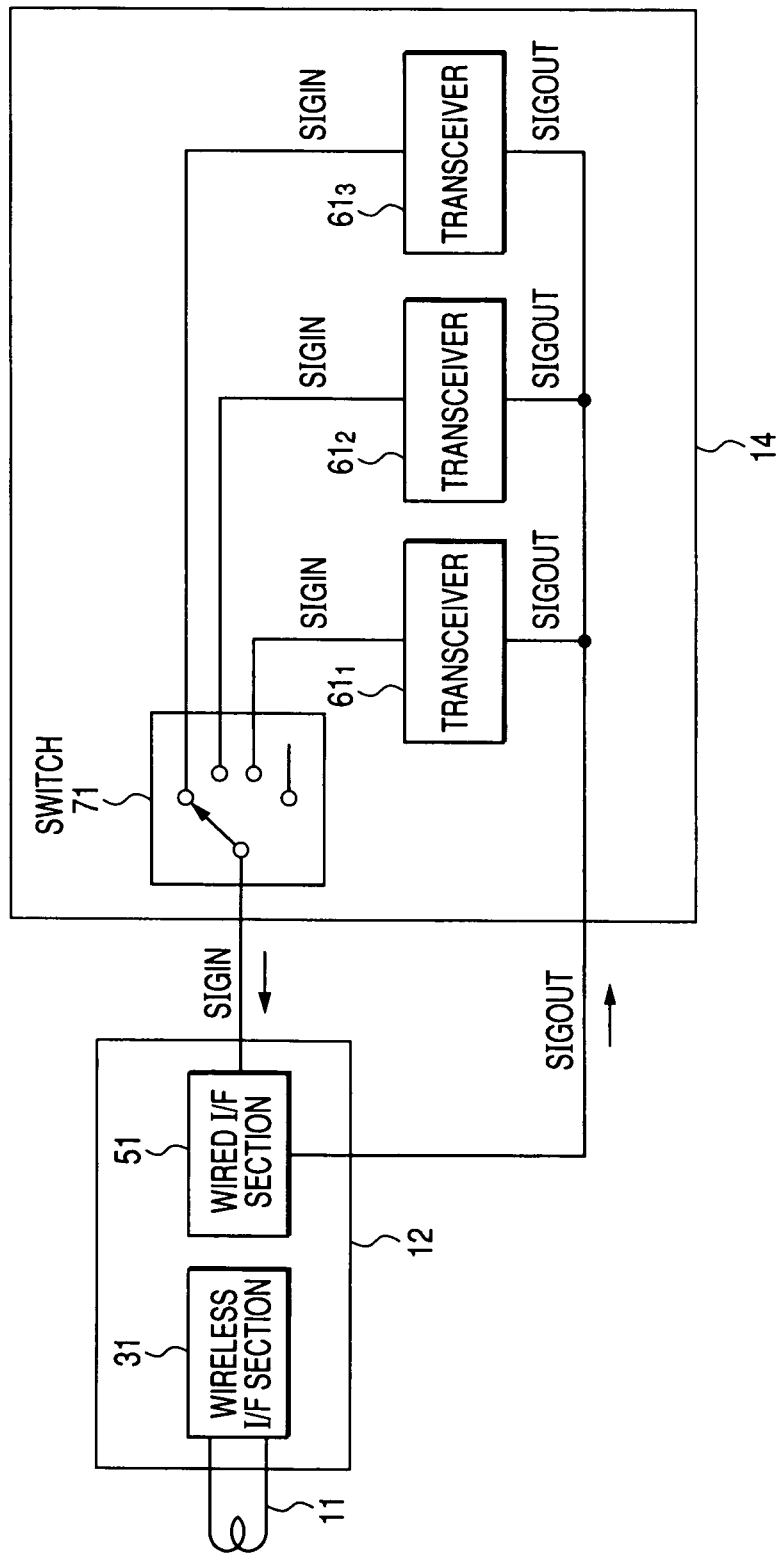
FIG. 9 is a block diagram showing a third configuration example of the front-end 12 and the message processing section 14.

Meanwhile, FIG. 9 shows a third configuration example of the front-end 12 and the message processing section 14 shown in FIG. 1. It should be noted that in the drawing the portions corresponding to the case in FIG. 2 or 6 are denoted with the same reference numerals, and hereinafter the explanations therefor will arbitrarily be omitted.

In FIG. 9, the message processing section 14 is similarly configured to the case shown in FIG. 6 except that the pull-up resistors R are not provided, and further, a switch 71 is provided instead of the AND gate 62.

The switch 71 has four terminals, and selectively connects any one of the four terminals to the SIGIN line connected to the wired I/F section 51.

In FIG. 9, first, second, and third terminals out of the four terminals of the switch 71 are respectively connected to the terminals of the transceivers $61_1$, $61_2$, and $61_3$ to which the SIGIN line is connected. Further, the fourth terminal of the four terminals of the switch 71 is not connected to any lines.

The switch 71 selects the ith terminal connected to the noticed transceiver $61_i$, with which the wired I/F section 51 intends to exchange data, out of the four terminals in accordance with, for example, the control of the controller 13 (FIG. 1).

Figure 7:
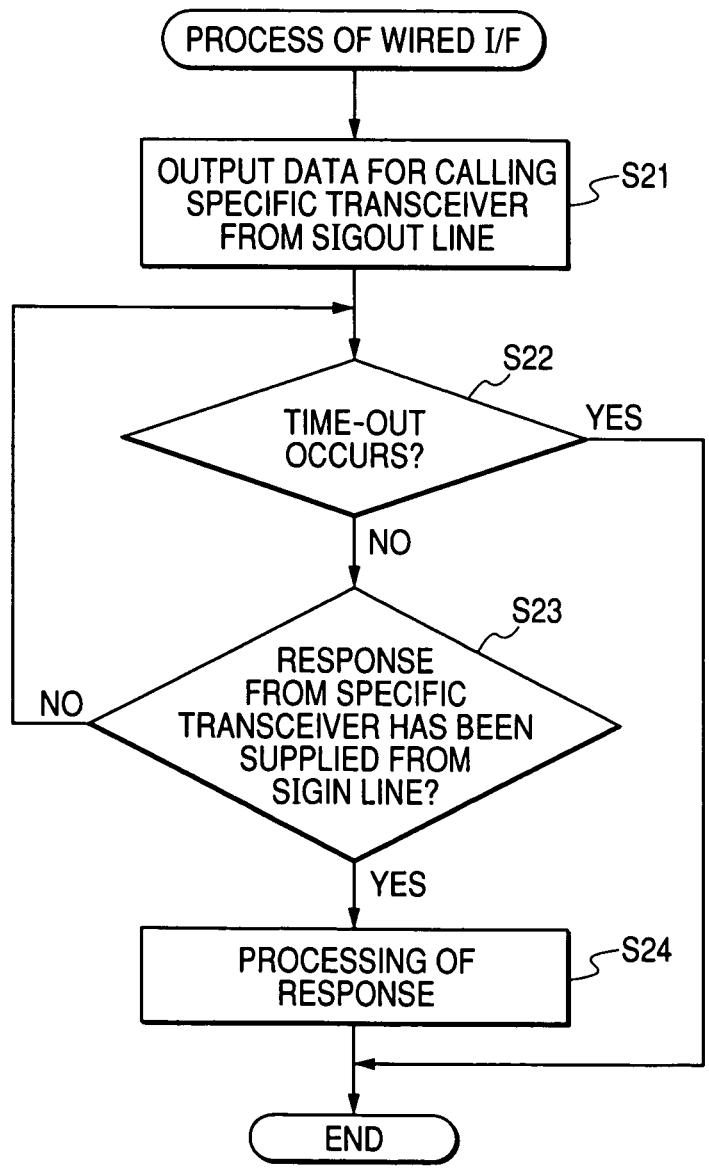
FIG. 7 is a flowchart for explaining a process of a wired I/F section 51.
Figure 8:
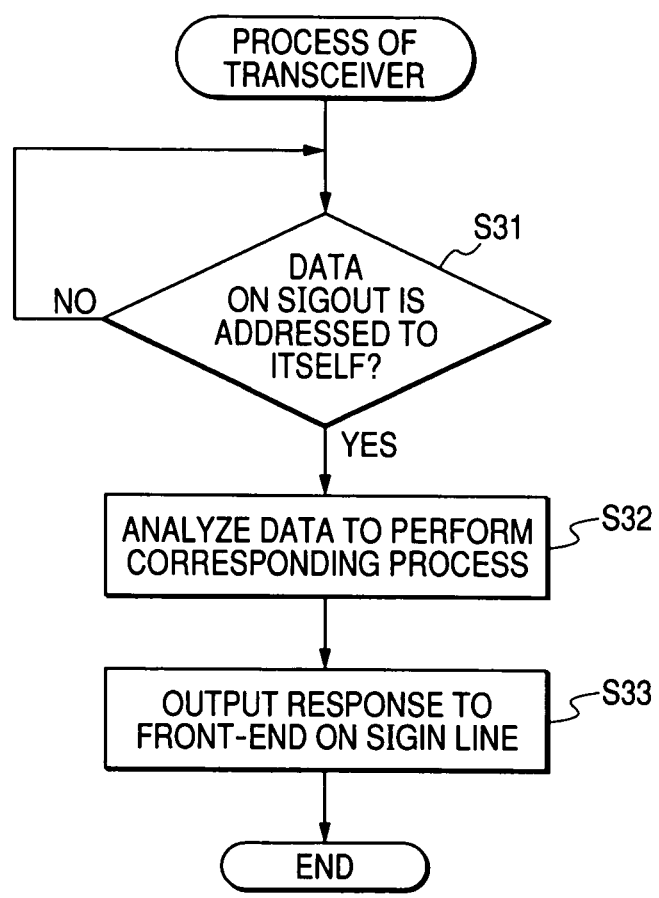
FIG. 8 is a flowchart for explaining a process of transceivers $61_1$ through $61_3$.

Then, the process according to the flowchart shown in FIG. 7 is performed in the wired I/F section 51, and the process according to the flowchart shown in FIG. 8 is performed in each of the transceivers $61_1$ through $61_3$, thus the data exchange is performed between the wired I/F section 51 and the noticed transceiver $61_i$.

Specifically, the data output by the wired I/F section 51 is transmitted via the SIGOUT line, and is received in the noticed transceiver $61_i$. Further, the data output by the noticed transceiver $61_i$ is transmitted via the switch 71 selecting the ith terminal and the SIGIN line, and is received by the wired I/F section 51.

It can be said that in the data exchange between the front-end 12 and the message processing section 14 shown in FIGS. 6 and 9, (the wired I/F section 51 of) the front-end 12 acts as a master, so to speak, and (the transceivers $61_1$ through $61_3$ of) the message processing section 14 acts as a slave, so to speak.

Further, a part or the whole of the process performed by the wired I/F sections 32 and 51, and the transceivers $41_1$ through $41_3$ and $61_1$ through $61_3$ described above can be performed by hardware and also by software. In the case in which the series of processes are performed by the software, the program composing the software is installed to microcomputers (computers built-in in the wired I/F sections 32 and so on and the transceivers $41_1$ through $41_3$ and so on to control the respective wired I/F sections 32 and so on and the transceivers $41_1$ through $41_3$ and so on) function as the wired I/F sections 32 and so on and the transceivers $41_1$ through $41_3$ and so on, respectively.

Figure 10:
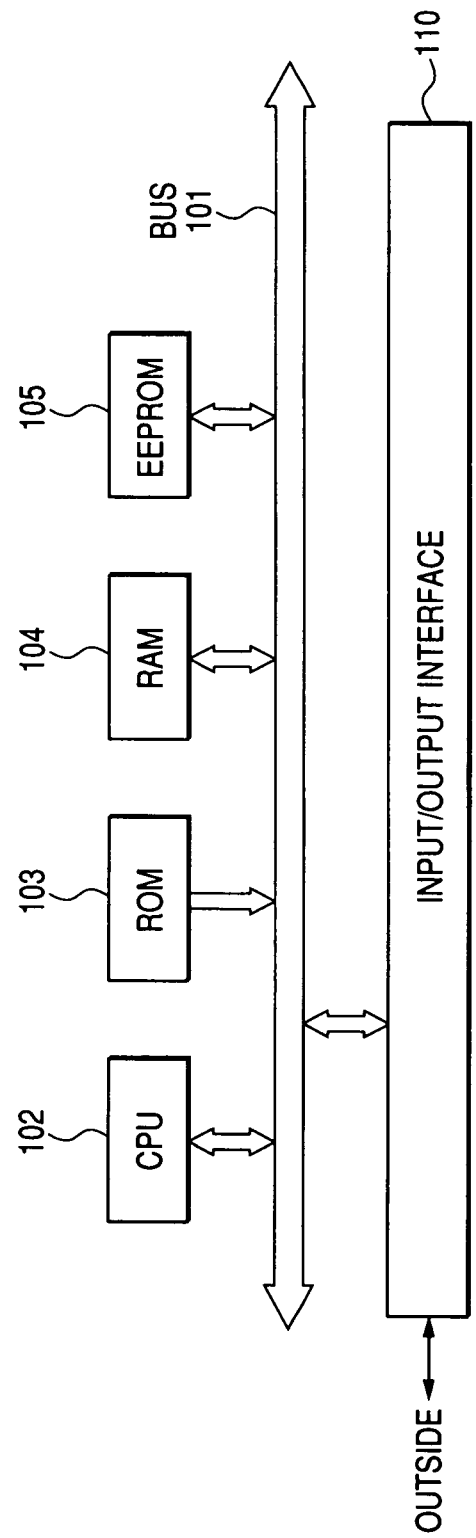
FIG. 10 is a block diagram showing a configuration example of an embodiment of a computer to which the invention is applied.

Accordingly, FIG. 10 shows a configuration example of an embodiment of the computer (microcomputer) to which the program for performing the series of processes described above is installed.

The program can previously be recorded (installed) in an electrically erasable programmable read only memory (EEPROM) 105 or a ROM 103 as a recording medium built-in in the computer.

Alternatively, the program can be provided by temporarily or permanently storing (recording) in a removable recording medium such as a flexible disk, a compact disc read only memory (CD-ROM), a magnetooptical (MO) disk, a digital versatile disc (DVD), a magnetic disk, or a semiconductor memory.

It should be noted that in addition to installing the program in the computer from the removable recording medium described above, the program can be transferred to the computer via a wired or wireless network in a wired manner, and the computer can receive the program thus transferred thereto by the input/output interface 110 to install it in the built-in EEPROM 105.

In the computer, a central processing unit (CPU) (or a digital signal processor (DSP)) 102, a read only memory (ROM) 103, a random access memory (RAM) 104, an EEPROM 105, and the input/output interface 110 are connected to each other via a bus 101.

The CPU 102 loads the program stored in the ROM 103 or the EEPROM 105 on the RAM 104 and then executes the program. Thus, the CPU 102 performs the processes along the flowcharts described above or the processes performed by the configurations of the block diagrams described above. It should be noted that the data exchange with the outside is performed via the input/output interface 110.

It should be noted here that in the present specification, the process steps describing the program for making the computer perform various processes are not necessarily required to perform in time series order along the order described as the flowcharts, and processes (e.g., parallel processing or processing with objects) performed in parallel or independently can also be included.

Further, the program can be processed by one computer, or can be processed by a number of computers in a distributed manner.

It should be noted that the embodiment of the invention is not limited to the embodiments described above, but can be modified in various forms within the scope or the spirit of the invention.

What is claimed is:

1. A communication device for performing near field communication, comprising:
  a near field communication device having
    a near field communication section for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and
    an interface section for supplying the near field communication section with data including identification information from a data processing device for processing data targeted by communication of the near field communication section, and supplying the data processing device with data from the near field communication section; and
  one or more of the data processing devices connected to the interface section by one output bus on which the data output by the interface section is transmitted, and one input bus on which the data input to the interface section is transmitted,
  wherein
  one of the one or more data processing devices includes bus right management means
    for judging whether or not a state, in which a voltage level of the input bus is an unused level representing that the input bus is not used, has continued for a predetermined time period determined using a random number, and
    for setting the voltage level of the input bus to an in-use level representing that the input bus is in use, thereby allowing the one of the one or more data processing devices to obtain a right of use of the input bus to transmit data and avoid transmission collision if it is judged that the state, in which the voltage level of the input bus is the unused level, has continued for the predetermined time period.

2. The communication device as recited in claim 1, wherein the bus right management means determines the predetermined time period by multiplying a random number by a predetermined unit time, the random number being in the range of one through ten.

3. A data processing device to be connected to a near field communication device, the near field communication device comprising:

a near field communication section for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section for supplying the near field communication section with data including identification information from a data processing device for processing data targeted by communication of the near field communication section, and supplying the data processing device with data from the near field communication section, the data processing device comprising bus right management means, connected to the interface section by one output bus on which the data output by the interface section is transmitted, and one input bus on which the data input to the interface section is transmitted, for judging whether or not a state, in which a voltage level of the input bus is an unused level representing that the input bus is not used, has continued for a predetermined time period determined using a random number, and for setting the voltage level of the input bus to an in-use level representing that the input bus is in use, thereby allowing the data processing device to obtain a right of use of the input bus to transmit data and avoid transmission collision if it is judged that the state, in which the voltage level of the input bus is the unused level, has continued for the predetermined time period.

4. A method for communication of a data processing device connected to a near field communication device, the near field communication device comprising:

a near field communication section for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section for supplying the near field communication section with data including identification information from the data processing device for processing data targeted by communication of the near field communication section, and supplying the data processing device with data from the near field communication section, the data processing device being connected to the interface section by one output bus on which the data output by the interface section is transmitted, and one input bus on which the data input to the interface section is transmitted, the method comprising the steps of:

judging whether or not a state, in which a voltage level of the input bus is an unused level representing that the input bus is not used, has continued for a predetermined time period determined using a random number; and setting the voltage level of the input bus to an in-use level representing that the input bus is in use, thereby allowing the data processing device to obtain a right of use of the input bus to transmit data and avoid transmission collision if it is judged that the state, in which the voltage level of the input bus is the unused level, has continued for the predetermined time period.

5. A non-transitory computer-readable recording medium storing a program that, when executed by a computer, controls a data processing device connected to a near field communication device to perform a method, the method including instructions for directing a near field communication section to perform near field communication in either one of communication modes, an active mode and a passive mode, the active mode being a communication mode for transmitting data. by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and an interface section to supply the near field communication section with data including identification information from the data processing device for processing data targeted by communication of the near field communication section, and supplying the data processing device with data from the near field communication section, the data processing device being connected to the interface section by one output bus on which the data output by the interface section is transmitted, and one input bus on which the data input to the interface section is transmitted;

wherein the data processing device comprises bus right management means for judging whether or not a state, in which a voltage level of the input bus is an unused level representing that the input bus is not used, has continued for a predetermined time period determined using a random number; and setting the voltage level of the input bus to an in-use level representing that the input bus is in use, thereby allowing the data processing device to obtain a right of use of the input bus to transmit data and avoid transmission collision if it is judged that the state, in which the voltage level of the input bus is the unused level, has continued for the predetermined time period.

6. A communication device for performing near field communication, comprising:
- a near field communication device having
    - a near field communication section for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and
    - an interface section for supplying the near field communication section with data including identification information from a data processing device for processing data targeted by communication of the near field communication section, and supplying the data processing device with data from the near field communication section; and
- one or more of the data processing devices connected to the interface section by one output bus on which the data output by the interface section is transmitted, and one input bus on which the data input to the interface section is transmitted,
- wherein one of the one or more data processing devices includes a bus right management unit configured to
    - judge whether or not a state, in which a voltage level of the input bus is an unused level representing that the input bus is not used, has continued for a predetermined time period determined using a random number, and
    - set the voltage level of the input bus to an in-use level representing that the input bus is in use, thereby allowing the one of the one or more data processing devices to obtain a right of use of the input bus to transmit data and avoid transmission collision if it is judged that the state, in which the voltage level of the input bus is the unused level, has continued for the predetermined time period.

7. A data processing device to be connected to a near field communication device, the near field communication device comprising:
- a near field communication section for performing near field communication in either one of communication modes, an active mode and a passive mode, the active mode being a communication mode for transmitting data by outputting an electromagnetic wave and modulating the electromagnetic wave in each of a plurality of devices for transmitting/receiving data, and the passive mode being a communication mode for transmitting data by outputting an electromagnetic wave and modulating the electromagnetic wave in one of the plurality of devices and for transmitting data in another of the plurality of devices by load-modulating the electromagnetic wave output by the one of the plurality of devices, and
- an interface section for supplying the near field communication section with data including identification information from a data processing device for processing data targeted by communication of the near field communication section, and supplying the data processing device with data from the near field communication section,
- the data processing device comprising
- a bus right management unit, connected to the interface section by one output bus on which the data output by the interface section is transmitted, and one input bus on which the data input to the interface section is transmitted, configured to
- judge whether or not a state, in which a voltage level of the input bus is an unused level representing that the input bus is not used, has continued for a predetermined time period determined using a random number, and
- set the voltage level of the input bus to an in-use level representing that the input bus is in use, thereby allowing the data processing device to obtain a right of use of the input bus to transmit data and avoid transmission collision if it is judged that the state, in which the voltage level of the input bus is the unused level, has continued for the predetermined time period.

\* \* \* \* \*